United States Patent [19]
Tsukahara et al.
[11] 3,963,779
[45] June 15, 1976

[54] NOVEL ORGANIC PHOTOCONDUCTIVE COMPOUND

[75] Inventors: Hirokazu Tsukahara; Kazuhiro Emoto, both of Kyoto, Japan
[73] Assignee: Mitsubishi Paper Mills, Ltd., Japan

[22] Filed: Sept. 5, 1972
[21] Appl. No.: 286,140

[30] Foreign Application Priority Data
Sept. 10, 1971 Japan ................................ 46-70618

[52] U.S. Cl. ...................... 260/570 R; 260/570.8 R; 260/570.9; 260/570 D; 96/1.5
[51] Int. Cl.[2] ........................................... C07G 87/28
[58] Field of Search ....... 260/570 R, 570,9, 570.5 P

[56] References Cited
UNITED STATES PATENTS

| | | | |
|---|---|---|---|
| 2,290,860 | 7/1942 | Burk et al. | 260/570 UX |
| 3,396,016 | 8/1968 | Olson | 96/1.5 X |
| 3,525,613 | 8/1970 | Hermes Nicoll | 96/1.5 X |
| 3,615,402 | 10/1971 | Rule | 96/1.5 |

*Primary Examiner*—Robert V. Hines
*Attorney, Agent, or Firm*—Cushman, Darby & Cushman

[57] ABSTRACT

A novel organic photoconductive compound having the general formula,

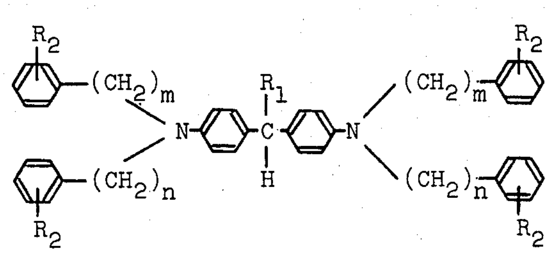

wherein $R_1$ is an alkyl group having 1–11 carbon atoms, $R_2$ is hydrogen, methyl, nitro or a halogen and n and m are integers of 1 or 2 and may be the same or different, can provide extremely highly sensitive and inexpensive elecrophotographic material.

6 Claims, 1 Drawing Figure

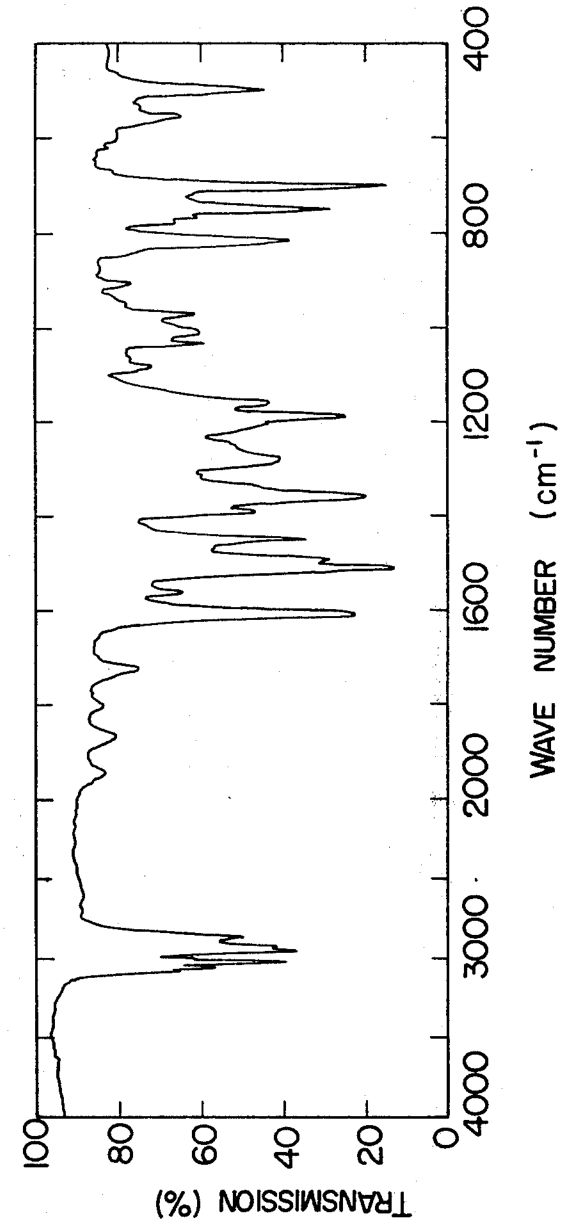
TRANSMISSION (%)
100
80
60
40
20
0
4000
3000
2000
1600
1200
800
400
WAVE NUMBER (cm-1)

NOVEL ORGANIC PHOTOCONDUCTIVE COMPOUND

The present invention relates to a novel organic photoconductive compound and an electrophotographic material having the same.

Various methods for electrophotographically forming an image are known and disclosed in a number of publications. These methods comprise charging the surface of a highly insulating layer in the dark, exposing imagewise the surface to increase the conductivity of the exposed portions thereby to form a latent image, thereafter making the latent image visible by suitable developing methods such as contacting with colored powders (toners).

Conventionally, inorganic photoconductive materials such as zinc oxide, etc. have been mainly used as a photosensitive material in the electrophotographic layer. However, recently, usefulness of organic photoconductive materials, especially excellent transparency thereof has attracted attention and the organic electrophotographic layers have become practicable, but they are still unsatisfactory in many points.

It is an object of the present invention to provide a novel organic photoconductive compound and furthermore to provide highly sensitive and inexpensive electrophotographic layer excellent in transmission in ultraviolet region.

The electrophotographic material according to the present invention comprises the novel organic photoconductive compound and electrically insulating polymer binder and if necessary, usual chemical sensitizers, spectral sensitizers and other additives such as plasticizers may be added thereto.

The novel organic photoconductive compound of the present invention is a compound having the following general formula,

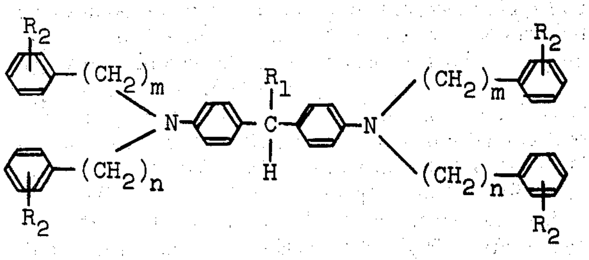

(wherein $R_1$ is an alkyl group having 1-11 carbon atoms, $R_2$ is hydrogen, methyl, nitro or a halogen and n and m are integers of 1 or 2 and may be the same or different).

When the number of carbon atoms in $R_1$ and the value of m and n are increased more than the upper limits mentioned above, excellent photoconductive materials may be obtained, but cost for production thereof is increased while the efficiency thereof is not so improved. Therefore, these compounds are industrially disadvantageous. As the halogens, chlorine and bromine are generally chosen.

The representatives of the compounds represented by said general formula are as follows:

No. 1

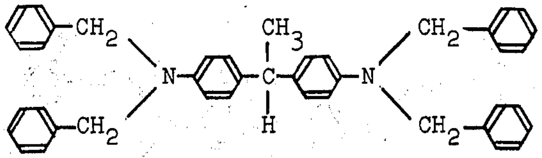

No. 2

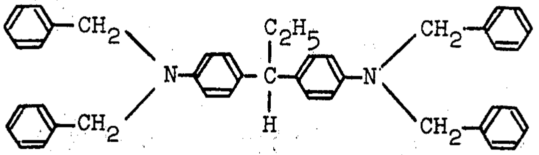

No. 3

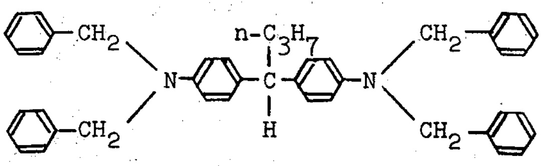

No. 4

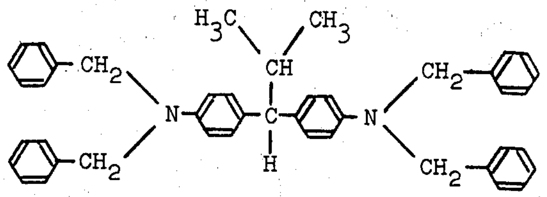

No. 5

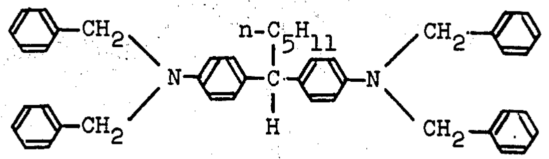

No. 6

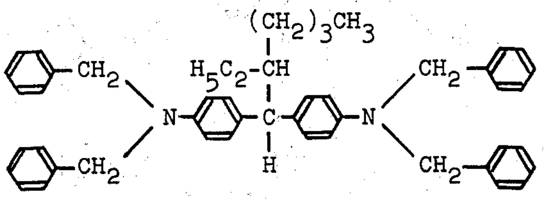

No. 7

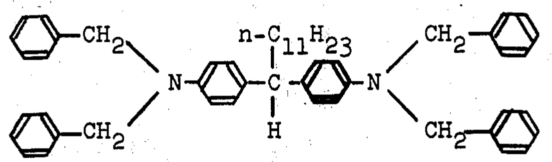

No. 8

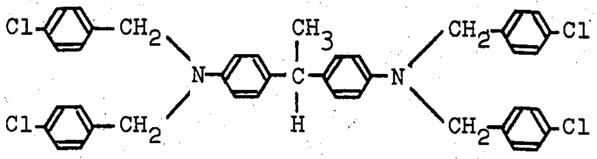

No. 9

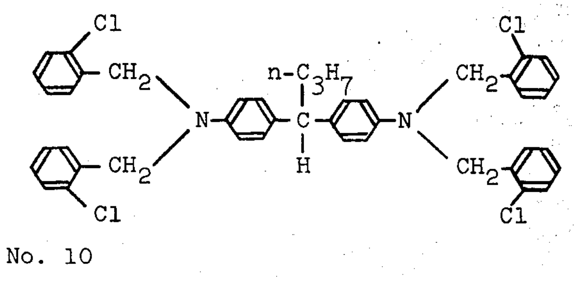

No. 10

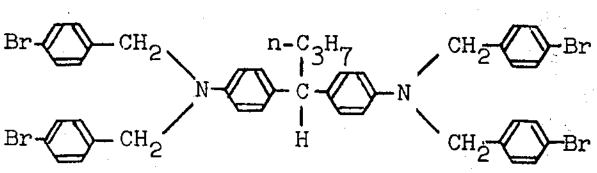

No. 11

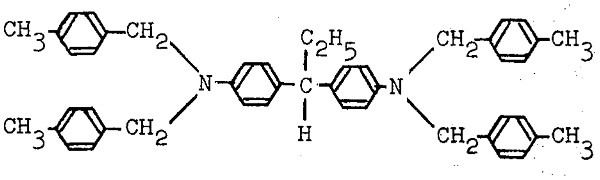

No. 12

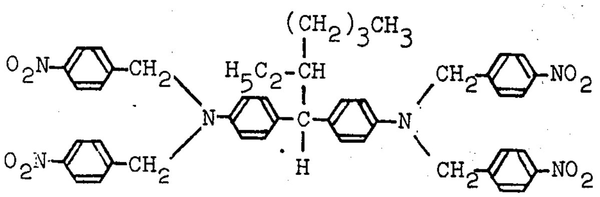

No. 13

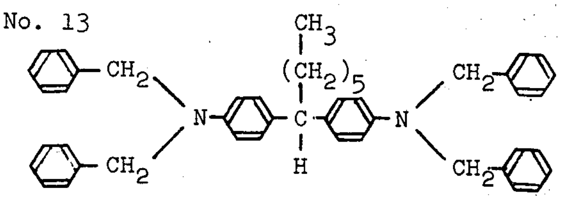

No. 14

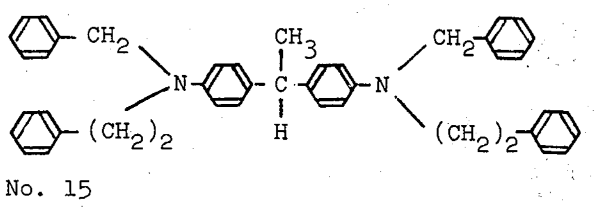

No. 15

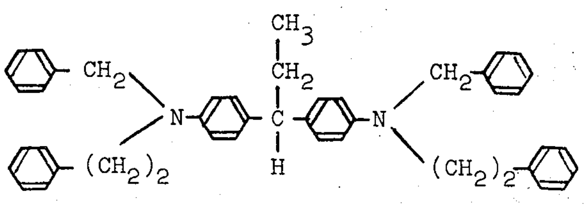

No. 16

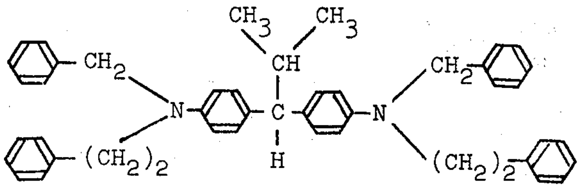

No. 17

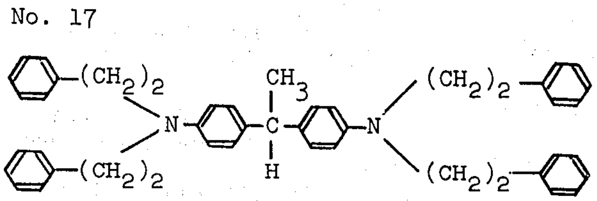

No. 18

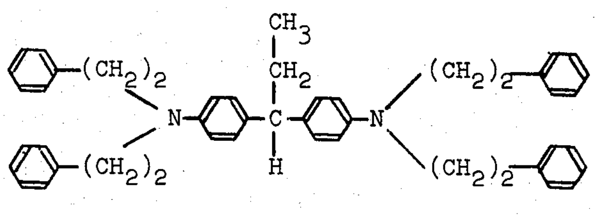

It should be noted that the above compounds are merely examples and the present invention should not be limited to these compounds.

When $R_1$ in said general formula is hydrogen, the corresponding compound tends to be denatured due to oxidation and when $R_1$ is phenyl group, the corresponding compound is also apt to be denatured by oxidation and moreover is ready to be crystallized in coated film because it has a high melting point. Therefore, both of these compounds are not suitable as organic photoconductive material for electrophotography and the inventors have found that $R_1$ must be an alkyl group.

FIG. 1 shows an infrared absorption spectrum of 1,1-bis(4-N,N-di-2-phenylethylaminophenyl)ethane which is one example of the organic photoconductive compounds of the present invention.

The excellent effects attained by the novel photoconductive organic compounds of the present invention Firstly, a photosensitive material for electrophotography which has extremely higher sensitivity than the conventional organic photoconductive compounds can be obtained by using the compound of the present invention. That is, according to the inventors' experiment, the known 1,1-bis(4-N,N-dialkylaminophenyl)alkanes having the structure close to that of the present compounds (said known alkanes are disclosed in DAS 2,046,914 (German Pat. Pub. No. 2,046,914) laid open for public inspection on April 8, 1971 and "Chemical Abstracts" Vol. 75, paragraph 103683 C, 1971) have a high dark conductivity (i.e., a low dark resistance) and so, the binder must be added in a large amount to maintain the photosensitive layer at a high insulation in the dark. That is, since the polymer materials as binder are those which are inert to light, when the value of amount of photoconductive compound/amount of binder is greater, electrophotographic photosensitive material having higher sensitivity can be produced. When the dark conductivity is high, said value must be lowered in order to obtain necessary image density and contrast and thus, a limitation in increase of sensitivity is necessarily present. On the other hand, when the dark conductivity is low, said value can be allowed to increase and thus, remarkable increase of sensitivity can be attained. The inventors have found that when N-alkyl group in said known alkanes is replaced by an aralkyl group, the dark conductivity is markedly lowered, while the photoconductivity is rather increased and moreover it becomes possible to decrease the amount of binder. Thus, it becomes possible to produce electrophotographic photosensitive material of extremely high sensitivity. The unexpectedly remarkable effects obtained by substitution of aralkyl group for N-alkyl group are specifically explained in Example 5 mentioned hereinafter.

That is, in said Example 5, coating liquids in which proportions of the components were changed in such a manner that the content of solid matters such as the organic photoconductive compound, a chemical sensitizer (this was added in an amount of 20% because this amount is practically optimum), a binder resin and sensitizing dye were always at constant were coated in a constant coating amount to obtain electrophotographic layers. The initial potential, sensitivity and state of copied image on said layers were examined to find that 1,1-bis(4-N,N-diaralkylaminophenyl)alkane which is the novel photoconductive compound of the present invention can yield an image of higher sensitivity and higher contrast than the conventional 1,1-bis(4-N,N-dialkylaminophenyl)alkane and can produce an electrophotographic layer of practically excellent property. Furthermore, in case of using the compound of the present invention, an image can be formed even in the absence of the binder. This is a surprising effect. There have never been any low molecular organic materials which can exhibit such effect other than polymers such as polyvinylcarbazole. The reduction of dark conductivity caused by substitution of aralkyl group for N-alkyl group in 1,1-bis(4 -N,N-dialkylaminophenyl)alkane is considered due to reduction of intramolecular polarization caused by reduction of basicity of nitrogen atom of tertiary amine, in other words, reduction of electron density. The increase of photoconductivity will be due to the introduction of aromatic ring such as benzene ring.

As shown in Example 6 mentioned hereinafter, when $R_1$ in said general formula is alkyl group and not hydrogen, an electrophotographic layer having higher sensitivity can be produced.

The second excellent effect attained by the novel photoconductive compound of the present invention is that the compound has a good transmission in ultraviolet region. For example, poly-N-vinylcarbazole which is one of the excellent organic photoconductive compounds has a peak of ultraviolet absorption at about 340 mμ and an extended absorption at the longer wavelength side, while the compound of the present invention, e.g., said No. 2 compound has a peak of ultraviolet absorption at about 306 mμ (shoulder) and completely transmits the light of about 340 mμ and the longer wavelength. This characteristic is advantageous when the electrophotographic material is to be utilized as a master paper (a second original) for diazo photosensitive paper and the copying speed to diazo copying paper can be remarkably improved.

Furthermore, the compound of the present invention has the excellent characteristic that the ultraviolet deterioration is low. That is, as shown in Example 8, deterioration and denaturation of electrophotographic photosensitive layer due to ultraviolet ray were less when the present compound was used than when di(4-N,N-dibenzyl aminophenyl)ether was used. Therefore, the electrophotographic layer using the present compound can stand the ultraviolet ray irradiation for a long period of time. That is, for example, when an electrophotographic paper is used as a second original for diazo photosensitive paper, said electrophotographic paper must be subjected to a number of ultraviolet rays. In this case, if the photoconductive material is the compound which tends to undergo deterioration with ultraviolet ray, it is denatured and decomposed to cause reduction in ultraviolet transmission and fog density of diazo copy is increased. Therefore, such photoconductive materials as undergoing light deterioration with difficulty are practically preferred.

In producing an electrophotographic layer with use of the organic photoconductive compound of the present invention, the compound must be coated on a conductive support such as metal plate, condition-treated paper or conduction-treated plastic film with use of a polymer binder. As the binder, the known binders such as polystyrene, polyvinyltoluene, polyvinylanisole, polychlorostyrene, poly-α-methylstyrene, polyvinylbutyral, polyvinylacetal, polybutyl methacrylate, copolystyrene-butadiene, copolystyrene-methyl methacrylate, polycarbonate, polysulfone, etc. may be used in the present invention.

For increasing the sensitivity, a chemical sensitizer or spectral sensitizer (sensitizing dye) can also be added. As the chemical sensitizer, para-chlorophenol, meta-chlorophenol, para-bromophenol, para-nitrophenol, 4-chloro-metacresole, para-phenylphenol, acetanilide, benzylacetanilide, N,N'-diethylbarbituric acid, N,N'-diethylthiobarbituric acid, succinic acid imide, diethyl malonate, malonic acid dianilide, 2,3,2',3'-tetrachloromalonic acid dianilide, pivaloylacetanilide, naphthalimide, 4-nitro-naphthalimide, α-naphthol, β-naphthol, phthalic acid monomethyl ester, salicylic acid, para-nitrobenzoic acid, etc. are especially effective. As the spectral sensitizers, triphenylmethane dyes such as Methyl Violet, Crystal Violet, Ethyl Violet, Night Blue, Victoria Blue, etc.; xanthene dyes such as Erythrosin, Rose Bengale, Rhodamine B, etc.; thiazine dyes such as Methylene Blue, Methylene Green, Methylene Violet, etc.; oxazine dyes such as Capri-Blue, Meldola's Blue, etc.; cyanine dyes such as 2,2'-quinocyanine, thiacyanine, oxacyanine, selenacyanine, etc.; and styryl dyes such as 1-ethyl-4-(4'-dimethylamino-styryl)-pyridinium perchlorate, 1-ethyl-2-(4'-dimethylaminostyryl)-quinolinium iodide, etc. are useful.

Besides these, plasticizers, curl preventing agent, matting agent (mate powders) may also be added.

An organic photoconductive compound, a high polymer binder and if necessary, a chemical sensitizer, a spectral sensitizer and other additives are dissolved in one or more of solvents such as aromatic solvents, e.g., benzene, toluene, xylene, monochlorobenzene, etc. or chlorinated hydrocarbon solvents, e.g., dichloromethane, chloroform, 1,2-dichloroethane, trichloroethylene, methyl-chloroform, etc., to which, if necessary, solvents such as alcohols, acetonitrile, N,N-dimethylformamide, dimethyl-sulfoxide, acetone, methylethylketone, etc. may be further added. Thus obtained solution or suspension is coated on a conductive support as mentioned above and is dried to obtain an electrophotographic layer. Alternatively, the materials to be added can be separately dissolved in separate solvents and thereafter, they are mixed to prepare a homogeneous coating liquid.

The mixing ratio of the organic photoconductive compound to the binder is preferably 1:0.5–1:10 by weight ratio.

The 1,1-bis(4-N,N-diaralkylaminophenyl)alkanes which are novel organic photoconductive compounds of the present invention are synthesized by the dehydrating condensation reaction of 2 moles of an N,N-diaralkylaniline such as N,N-dibenzylaniline, N-benzyl-N-2-phenylethyl-aniline, N,N-di-2-phenylethylaniline, N,N-di(para-chlorobenzyl)aniline, N,N-di(ortho-chlorobenzyl)aniline, N,N-di(para-bromobenzyl)aniline, N,N-di(para-methylbenzyl)-aniline, or N,N-di(-para-nitrobenzyl)aniline and 1 mole of an alkylaldehyde such as acetaldehyde, propionaldehyde, normal-butyraldehyde, iso-butyraldehyde or normal-heptyl aldehyde. Said reaction is markedly accelerated by adding an acid such as glacial acetic acid, trichloroacetic acid, hydrochloric acid, sulfuric acid, zinc chloride, or aluminum chloride as a catalyst. Particularly, in case of adding an organic carboxylic acid such as glacial acetic acid or trichloroacetic acid, the product does not become a salt with the acid and can be directly obtained as a free base. The 1,1-bis(4-N,N-di-aralkylaminophenyl)-alkanes are novel compounds which have never been disclosed in any literatures.

The method for synthesis of one of the novel organic photoconductive material used in the present invention will be explained in detail below.

The synthesis of the organic photoconductive material No. 2:

273 g of N,N-dibenzylaniline (melting point 71.0°–72.0°C), 58 g of propionaldehyde and 200 ml of glacial acetic acid were mixed and the mixture was refluxed on a steam bath for 100 hours. Then the mixture was concentrated to dryness under reduced pressure and the residue was washed with methanol. Crude crystals were taken out by filtration and dried to yield 250 g of the product (yield = 85%). The product was purified by repeated recrystallizations from ethyl acetate and then from methyl ethyl-ketone to obtain pure objective 1,1-bis(4-N,N-dibenzyl-aminophenyl)propane (no impurities were detected according to thin layer chromatography) as a colorless crystal.

Analysis:

Calc.: C 88.01%, H 7.21%, N 4.77%

Found: C 87.97%, H 7.29%, N 4.82%

Molecular weight measured by Rast method = 580 (586.78 by calculation). An intense absorption peak which was not seen with the starting materials was observed at near 820 $cm^{-1}$ in infrared absorption spectrum. Said peak shows the presence of para-di-substituted benzene ring.

The present invention will be illustrated in the following Examples.

EXAMPLE 1

To 10 g of each organic photoconductive compounds and comparative compounds enumerated in Table 1, 12 g of polystyrene (polymer material as a binder) and 1 g of N,N'-diethylthiobarbituric acid (chemical sensitizer) was added toluene as a solvent to obtain a solution in a total amount of 125 g, to which 5 ml of a 1% dimethylformamide solution of Crystal Violet (spectral sensitizer) was further added and they were well mixed. Thus prepared colored solution was coated on a conduction-treated glazed tracing paper (weight of base paper was 60 $g/m^2$) in such a manner that the coating amount when dried was 5 $g/m^2$ and then dried with hot air. The surface of each sample thus obtained was negatively charged by means of a corona discharge in the dark and then the surface were exposed to white light from tungsten lamp (illuminance at the surface of the samples was 5 luxes) and attenuation velocity of the surface potential was measured. The attenuation velocity, namely, the sensitivity of electrophotographic layer can be expressed by exposure amount required for reducing the potential by half. Therefore, this value is mentioned in Table 1 together with initial potential.

As practical test, the negatively charged surface of each sample was exposed imagewise through a transparent positive original at 500 luxes × 0.2 second and then liquid-developed to make the electrostatic latent image visible. Thus obtained positive image was evaluated with the naked eyes and the results are also shown in Table 1.

The compounds used in samples No. 1–12 in Table 1 are organic photoconductive materials used in the present invention and samples No. 13–18 are those which were used for comparison and which are starting materials for producing the organic photoconductive materials of the present invention.

Table 1 shows that with use of the organic photoconductive compounds of the present invention the electrophotographic layers which are highly sensitive and which can produce excellent images were produced, while with use of N,N-dibenzylanilines, practically usable electrophotographic layers were not produced.

Table 1

| Sample number | Number of organic photoconductive compound or name thereof | Initial potential (Volt) | Exposure amount required for reducing potential by half (lux. second) | Results of practical test |
|---|---|---|---|---|
| 1 | No. 1 | 560 | 70 | Excellent image was obtained |
| 2 | No. 2 | 600 | 45 | " |
| 3 | No. 3 | 600 | 48 | " |
| 4 | No. 4 | 595 | 45 | " |
| 5 | No. 5 | 610 | 40 | " |
| 6 | No. 6 | 590 | 43 | " |
| 7 | No. 7 | 620 | 78 | " |
| 8 | No. 8 | 440 | 90 | " |
| 9 | No. 9 | 600 | 75 | " |
| 10 | No. 10 | 570 | 85 | " |
| 11 | No. 11 | 550 | 55 | " |
| 12 | No. 12 | 650 | 45 | " |
| 13 | N,N-dibenzyl-aniline | 120 | No attenuation | No image was obtained |
| 14 | N,N-di(para-clorobenzyl)-aniline | 490 | 2,750 | Extremely fogged image was obtained |
| 15 | N,N-di(ortho-chlorobenzyl)-aniline | 640 | 2,550 | " |
| 16 | N,N-di(para-bromobenzyl)-aniline | 490 | 1,225 | Fogged image was obtained |
| 17 | N,N-di(para-methylbenzyl)-aniline | 70 | No attenuation | No image was obtained |
| 18 | N,N-di(para-nitrobenzyl)-aniline | 600 | 1,550 | Fogged image was obtained |

EXAMPLE 2

With use of the organic photoconductive compound No. 4 of the present invention, colored photosensitive solution was prepared by the same formulation as in Example 1. The resultant solution was coated on a conductiontreated white and opaque electrophotographic paper (weight of base paper was 80 $g/m^2$) in such a manner that the coating amount when dried was 5 $g/m^2$ and then dried with hot air. Then, the exposure amount required for reducing the potential by half was measured to obtain 25 lux.second.

Next, the practical test was carried out to obtain a fogless image with an imagewise exposure at 500 luxes × 0.1 second.

A practical experiment was carried out under the same conditions as mentioned above except that an aluminum plate was substituted for paper to obtain a fogless and clear image substantially corresponding to the original with imagewise exposure of 500 luxes × 0.1 second.

EXAMPLE 3

10 Grams of the organic photoconductive compound No. 2, 15 g of polycarbonate and 1.5 g of 4-chlorometacresol were dissolved in monochlorobenzene to obtain a solution in a total amount of 150 g, to which 5 ml of 1% dimethylformamide of Crystal Violet was added and they were well mixed. The resultant liquid was coated on the same tracing paper as used in Example 1 and was dried to obtain an electrophotographic paper in which the coating amount of solid matter was 4 g/$m^2$. The surface of the sample was negatively charged and then was exposed imagewise through a transparent positive original at 500 luxes × 0.2 second. Then, liquid development was carried out to obtain a fogless positive image. The resultant positive image as a second original was copied to Azona photosensitive paper YP-B (manufactured by Azona K.K.) with Copy Flex Model 110 (light source was a high pressure mercury arc lamp) which was a positive copying apparatus manufactured by Bruning Co., U.S.A. at the highest speed dial of said apparatus with wet system to obtain a clear and substantially fogless copy (fog density 0.02).

On the other hand, 10 g of poly-N-vinylcarbazole which was a known organic photoconductive compound was dissolved in 90 g of monochloro-benzene and 2 ml of 1% Crystal Violet solution was added thereto and mixed. Then, the liquid was coated on the same tracing paper as mentioned above in such a manner that the coating amount when dried was 4 g/$m^2$ and dried. The surface of thus obtained sample was negatively charged and then exposed imagewise at 500 luxes × 0.4 second and developed with a liquid developer to obtain a fogless image. Next, under the same conditions as mentioned above, the resultant image was copied to a diazo photosensitive paper to yield only a fogged copy (fog density 0.13). In order to control the fog density to the same degree as of the copy obtained using the present compound, a twice exposure time was required and copying speed was decreased by half. From said results, it becomes clear that use of the organic photoconductive compound of the present invention not only can increase copying speed of electrophotographic image itself, but also can sharply increase the copying speed to a diazo photosensitive paper.

EXAMPLE 4

15 Grams of said organic photoconductive compound No. 3, 22.5 g of polystyrene and 3 g of bis(5-chloro-2-hydroxyphenyl)methane were dissolved in toluene to obtain 300 g of a solution, to which 3 ml of 0.5% methanol solution of 1-ethyl-4-(4'-dimethylaminostyryl)-quinolinium iodide was added to obtain a homogeneous solution. The resultant solution was coated on an electrophotographic paper (the weight of base paper was 80 g/$m^2$) subjected to suitable conduction treatment and was dried to produce an electrophotographic paper having a coating amount of solid matter of 5.5 g/$m^2$.

The surface of thus obtained sample was positively charged in the dark and then was exposed imagewise using a negative microfilm as an original with a magnifying projector at 1,000 luxes × 0.1 second and immediately thereafter the surface of the sample was allowed to contact with dry system toner for negative charge with magnetic brush toner applicator. Subsequently, the surface was irradiated with infrared ray to measure the fixation of the formed image to find that a satisfactory positive magnified image was obtained.

EXAMPLE 5

Ten kinds of electrophotographic coating liquids having the various compositions as shown in Table 2 were prepared using 1,1-bis(4-N,N-dimethylaminophenyl)propane which was a known organic photoconductive compound and 1,1-bis(4-N,N-dibenzylaminophenyl)propane which was the novel organic photoconductive compound of the present invention. Each of these coating liquids was coated on a conduction-treated electrophotographic paper (the weight of base paper was 80 g/$m^2$) in such a manner that the coating amount when dried was 5–6 g/$m^2$ and was dried.

The surface of each sample was negatively charged by means of a corona discharge and then was exposed to white light from tungsten lamp and attenuation velocity of the surface potential was measured. The attenuation velocity, namely, the sensitivity of electrophotographic layer can be expressed by exposure amount required for reducing the potential by half as mentioned before and so, the exposure amount is also mentioned in Table 3 together with the initial potential (= surface potential after about 3 seconds of charging by means of a corona discharge in the dark).

Next, as practical test, the surface of each sample produced as above was negatively charged and then was exposed imagewise at 500 luxes × 0.5 second through a transparent positive original. Thereafter, the surface was developed with a liquid developer to make the electrostatic latent image visible. The results of thus obtained positive image are also mentioned in Table 3.

Table 2

| Number of coating liquid | Compositions of coating liquid for electrophotography: Organic photoconductive compound (g) | N,N'-diethyl-thiobarbituric acid *1 (g) | Polycarbonate resin *2 (g) | Monochlorobenzene *3 (g) | Dye solution *4 (ml) |
|---|---|---|---|---|---|
| No. 1 | 1.0 | 0.20 | 0 | 6.0 | 0.25 |
| No. 2 | 0.9 | 0.18 | 0.12 | 6.0 | 0.25 |
| No. 3 | 0.8 | 0.16 | 0.24 | 6.0 | 0.25 |
| No. 4 | 0.7 | 0.14 | 0.36 | 6.0 | 0.25 |
| No. 5 | 0.6 | 0.12 | 0.48 | 6.0 | 0.25 |
| No. 6 | 0.5 | 0.10 | 0.60 | 6.0 | 0.25 |
| No. 7 | 0.4 | 0.08 | 0.72 | 6.0 | 0.25 |
| No. 8 | 0.3 | 0.06 | 0.84 | 6.0 | 0.25 |
| No. 9 | 0.2 | 0.04 | 0.96 | 6.0 | 0.25 |
| No. 10 | 0.1 | 0.02 | 1.08 | 6.0 | 0.25 |

Note:
*1 Chemical sensitizer
*2 Binder
*3 Solvent
*4 1%-Dimethylformamide solution of sensitizing dye Crystal Violet Table 3

Relation between compositions of coating liquid and electrophotographic characteristics

| Organic photo-conductive compound | 1,1-bis(4-N,N-dimethylaminophenyl)propane *1 | | | 1,1-bis(4-N,N-dibenzylaminophenyl)propane *2 | | |
|---|---|---|---|---|---|---|
| Number of coating liquid | Initial potential (Volt) | Exposure amount required for reducing the potential by half (lux × sec.) | State of image | Initial potential (Volt) | Exposure amount required for reducing the potential by half (lux × sec.) | State of image |
| No. 1 | 0 | — | No image was formed | −100 | 25 | Low density |
| No. 2 | 0 | — | " | −170 | 35 | " |
| No. 3 | −25 | — | " | −345 | ' | Somewhat low density |
| No. 4 | −110 | 110 | Image of low density | −360 | 42 | " |
| No. 5 | −120 | 175 | " | −510 | 45 | Excellent |
| No. 6 | −130 | 600 | " | −605 | 50 | " |
| No. 7 | −155 | 1,200 | " | −610 | 65 | " |
| No. 8 | −375 | 1,250 | Image of somewhat low density and of somewhat fog | −605 | 150 | Somewhat fogged |
| No. 9 | −620 | 1,400 | Image having fog | −615 | 700 | Fogged |
| No. 10 | −615 | 6,500 | Image having great fog | −620 | 5,500 | Severely fogged |

Note:
*1 The known compounds
*2 Novel compounds of the present invention

From Tables 2 and 3, the following facts have become clear.

1,1-Bis(4-N,N-dibenzylaminophenyl)propane provided higher absolute value of initial potential even when the amount of binder was small and higher sensitivity, even when the compositions were the same, than 1,1-bis(4-N,N-dimethylaminophenyl)propane. Moreover, since the former provided sufficient initial potential to form images of high density when the amount of binder was small, (namely, the amount of organic photoconductive compound was large), highly sensitive and practically excellent electrophotographic layer in which an image of high contrast was formed could be produced.

EXAMPLE 6

1 Grams of each organic photoconductive compound as shown in Table 4, 0.1 g of N,N'-diethylthiobarbituric Table 4

Relation between the kind of substitutes of organic photoconductive compounds represented by the general formula

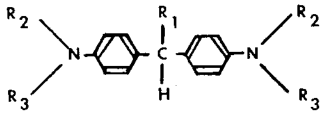

and electrophotographic characteristics

| Compound No. | Kind of substituents $R_1$ | $R_2$ | $R_3$ | Initial potential (Volt) | Exposure amount required for reducing the potential by half (lux × second) |
|---|---|---|---|---|---|
| i | $CH_3$ | $CH_3$ | $CH_3$ | 0 | — |
| ii | $CH_3CH_2CH_2$ | $CH_3CH_2$ | $CH_3CH_2$ | −125 | 175 |
| iii | H | 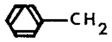 | 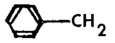 | −440 | 130 |
| No. 1 | $CH_3$ | 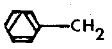 | 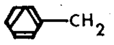 | −540 | 60 |
| No. 3 | $CH_3CH_2CH_2$ | 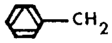 | 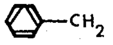 | −590 | 45 |
| No. 14 | $CH_3$ |  | 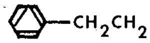 | −500 | 70 |
| No. 17 | $CH_3$ | 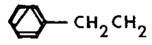 | 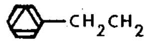 | −405 | 78 |

acid and 1 g of polycarbonate resin were mixed and dissolved in 11 g of monochlorobenzene. To the resultant solution was further added 0.5 ml of a 1%-dimethylformamide solution of Crystal Violet and they were homogeneously mixed. Thus obtained blue colored solution was coated on a glazed tracing paper (weight of base paper was 60 g/m$^2$) manufactured by Mitsubishi Paper Mills Co. in such a manner that the coating amount of solid matter was about 6 g/m$^2$ when dried and was dried.

The surface of each of thus obtained 7 samples was negatively charged by means of a wire corona discharge in the dark and then while white light from tungsten lamp was irradiated on the surface of the samples (the illuminance of the surface was 5 luxes), the attenuation velocity of the surface potential was measured. The initial potential and the exposure amount required for reducing the potential by half are shown in Table 4.

In the above Table 4, the compounds i, ii and iii are known comparative compounds and the compounds No. 1, 3, 14 and 17 are the novel compounds of the present invention.

From the Table 4, it has become clear that the compounds in which $R_2$ and $R_3$ were aralkyl groups such as benzyl and 2-phenylethyl provided higher absolute value of initial potential and higher sensitivity than those in which $R_2$ and $R_3$ were alkyl groups such as methyl and ethyl. Among those where $R_2$ and $R_3$ were aralkyl groups, when $R_1$ is an alkyl group such as methyl or butyl, remarkably higher sensitivity was obtained than when $R_1$ was hydrogen.

EXAMPLE 7

The following practical tests were conducted on the electrophotographic sensitive paper produced in Example 6.

That is, a drawing written with a pencil on a white paper as an original was copied to said electrophotographic paper with an electrocopying machine "Copystar-A-2 Auto" (light source is a tungsten arc lamp and the development is the liquid developing system) manufactured by Mita Kogyo K.K. at exposure controlling dial graduation of 6 (the graduation is from 1 to 10 and with increase of the numerals, the exposure amount increases). The following results were obtained. In case of using compound i, no toners sticked to the surface of the sample and hence, no image was formed; in case of compound ii, image was obtained, but it was of low density and had conspicuous fog; and in case of compound iii, the density of the image formed was high, but the image had conspicuous fog. On the other hand, in case of using compounds No. 1, 3, 14 and 17, such beautiful images as having no or substantially no fogs, having high density and excellent contrast were obtained.

Then, these copies (images) as second originals were copied to diazo photosensitive paper with the positive copying apparatus "Copyflex Model 110" (light source was high pressure mercury arc lamp) manufactured by Bruning Co. in U.S.A. at the highest copying speed (graduation 12). As the results, in case of compound i, naturally no image was obtained; in case of compound ii, the line portions of the image obtained were broken and the image could not be practically utilized; in case of compound iii, the density of the image was satisfactory, but fogs were conspicuously caused, while in case of using compounds No. 1, 3, 14 and 17, copies having excellent contrast and no fogs were obtained.

EXAMPLE 8

10 Grams of an organic photoconductive compound, 15 g of polystyrene and 1.5 g of bis(5-chloro-2-hydroxyphenyl)methane were dissolved together in toluene to obtain 200 g of a solution. To the solution was added 1 ml of 1%-dimethylformamide solution of Crystal Violet to obtain a homogeneous solution, which was coated on a tracing paper (weight of base paper was 60 g/m$^2$) and dried to obtain an electrophotographic paper having the coating amount of solid matter of 6 g/m$^2$.

Then, in accordance with the usual method, the surface of said electrophotographic paper was negatively charged in the dark and then was exposed through a transparent positive original and was developed by a liquid developing method to obtain a visible image. In this Example, an exposure of 500 luxes × 3.0 sec. was effected to an electrophotographic paper which used di(4-N,N-di-benzylaminophenyl)ether (the known compound) as the organic photoconductive compound, while an exposure of 500 luxes × 1.0 sec. was effected to an electrophotographic paper which used 1,1-bis(4-N,N-dibenzylaminophenyl)normal-heptane (the novel compound of the present invention). That is, practical sensitivity of the former was one-third that of the latter.

Next, thus obtained copies as second originals were copied to 101 sheets of diazo photosensitive paper with the positive copying machine used in Example 7 at a speed of dial graduation 12. The fog density of non-image parts (ground) in the first copy and the 101st copy was measured. In case of using the electrophotographic paper which had the known compound, the fog density of the first and 101st copies was 0.04 and 0.31, respectively (namely, increment of the fog density was 0.27), while in case of the electrophotographic paper which had the present compound, the fog density of the first and 101st copies was 0.02 and 0.17, respectively (namely, the increment of the fog density was 0.15). The latter had extremely higher resistance to light from a high pressure mercury lamp than the former.

EXAMPLE 9

1.0 Gram of each organic photosensitive compound shown in Table 5, 0.9 g of polycarbonate as a binder resin and 0.1 g of phenol resin (Phenol resin No. 26476 manufactured by Hooker-Durez Co. in U.S.A.) were mixed and dissolved in 11 g of monochlorobenzene. To the resultant solution was added 2.0 ml of 0.5% acetonitrile solution of sensitizing dye 4-(4-N,N-dimethylaminostyryl)-6-tertiary-butyl-benzo-thiopyrylium perchlorate and they were homogeneously mixed. Thus obtained solution was coated on a conduction treated electrophotographic paper (weight of base paper was 70 g/m$^2$) and was dried. The coating amount of solid matter when dried was 7.5 ± 0.5 g/m$^2$.

The initial potential and the exposure amount required for reducing the potential by half were measured in accordance with the method employed in Example 5. The practical tests were also conducted in accordance with the same method as in Example 5. The results are shown in Table 5.

Table 5

| Ex-peri-ment No. | Organic photocon-ductive compound | Initial potential (Volt) | Exposure amount required for reducing the potential by half (lux × second) | State of image |
|---|---|---|---|---|
| | Kinds of organic photoconductive compounds and electrophotographic characteristic thereof | | | |
| 5–1 | 1,1-bis(4-N,N-diethyl-aminophenyl)-2-methyl propane | −190 | 155 | Low density and somewhat fogged |
| 5–2 | 1,1-bis(4-N,N-dibenzyl-aminophenyl)-2-methyl propane | −620 | 40 | Extremely ex-cellent in contrast |
| 5–3 | 1,1-bis(4-N-benzyl-N-2-phenylethylamino-phenyl)-2-methyl propane | −570 | 65 | Excellent in contrast |
| 5–4 | 1,1-bis(4-N,N-di-2-phenylethylamino-phenyl)-2-methyl propane | −510 | 75 | Excellent in contrast |

Table 5 shows that the organic photoconductive compounds in which N-substituent was an aralkyl group such as benzyl or 2-phenylethyl group could provide images having higher absolute value of the initial potential, higher sensitivity and more excellent contrast than those in which N-substituent was an alkyl group such as ethyl group.

What is claimed is:

1. A novel photoconductive compound having the general formula,

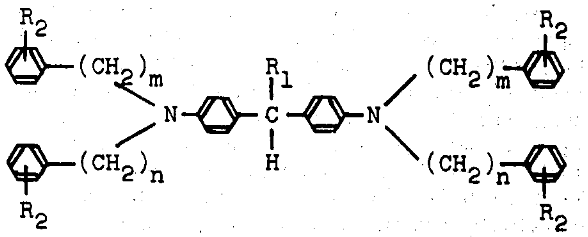

wherein $R_1$ is an alkyl group having 1–11 carbon atoms, $R_2$ is a member selected from the group consisting of hydrogen, methyl, nitro and halogens and n and m are integers of 1 or 2 and may be the same or different.

2. A compound according to claim 1 wherein $R_2$ is hydrogen.

3. A compound according to claim 1 wherein $R_2$ is halogen.

4. A compound according to claim 3 wherein the halogen is chlorine or bromine.

5. A compound according to claim 1 wherein $R_2$ is nitro.

6. A compound according to claim 1 wherein $R_2$ is methyl.

* * * * *